2,981,657
THYROPROTEIN AND STROPHANTHIN COMPOSITION FOR REDUCING BODY WEIGHT

Donald V. Hall, Oswego, Oreg., assignor, by mesne assignments, to Bariatric Corporation, Portland, Oreg., a corporation of Oregon No Drawing. Filed Dec. 19, 1956, Ser. No. 629,247

6 Claims. (Cl. 167—55)

This invention pertains to therapeutic compositions, and relates particularly to a thyroactive composition which is of particular utility in the reduction of body weight without undue restriction of normal eating habits.

It is a practice in the treatment of obesity to administer substances exhibiting thyroidal activity, such as extracts of the thyroid gland, thyroxin, and others. However, these substances are recognized to produce deleterious side effects in some patients. In addition, the level of toxicity of these substances for many patients places a serious limitation on their use, for in such cases reduction in weight cannot be achieved within the restricted therapeutic limit of safe usage. In this regard, it also has been a practice of some physicians to administer such substances as digitalis and other cardiotonics in an effort to counteract the harmful effects produced by inadvertent overdoses of the thyroactive substances.

It is also recognized that the use of cardiotonics, such as digitalis and strophanthin, often is attended by undesirable side effects, and since digitalis is cumulative, its use frequently produces harmful results. The side effects produced by strophanthin are less severe than digitalis, since strophanthin is rapidly excreted and is not cumulative. However, strophanthin heretofore has been limited primarily to use by intravenous injection, whereas digitalis may be administered both orally and intravenously.

It is a principal object of this invention to provide an effective thyroactive composition which may be administered safely in oral dosages substantially greater than has been possible with prior compositions.

Another important object of the present invention is to provide a thyroactive composition adapted specifically for oral administration and characterized by effective and reliable prophylactic use of strophanthin.

A further important object of this invention is the provision of a thyroactive composition which includes thyroprotein and strophanthin as active ingredients, and which composition is effective and safe in the reduction of body weight.

The foregoing and other objects and advantages of this invention will become apparent from the following detailed description of the composition of the present invention.

In its basic concept, the present invention involves the proper administration of a composition which comprises the combination of thyroprotein and strophanthin as active ingredients, preferably carried in a vehicle suitable for the preparation of tablets for oral administration.

Thyroprotein suitable for the composition of the present invention may be derived from various sources. In its preferred form, the thyroprotein is iodinated casein prepared in such manner as to contain preformed thyroxin and other iodinated forms of various amino acids.

The form of strophanthin suitable for the composition of the present invention also may be derived from various sources, such as Strophanthus kombe or Strophanthus gratus. The glycoside derived from Strophanthus kombe is preferred.

The carrier for the active ingredients may be composed of various substances or combinations thereof. For use in the preparation of tablets, the carrier may be composed of dextrose, dextrin and acacia, which function as binders and diluents. In addition, any well-known tablet lubricant, such as magnesium stearate, may be incorporated to prevent sticking of the tablets in the tablet die during formation.

The composition providing thyroprotein and strophanthin as active ingredients also may be prepared for oral administration in the form of a liquid suspension or solution, in the form of a capsule, or as a powder.

The proportions of thyroprotein and strophanthin may be varied within substantially wide limits, depending in part upon the condition of the patient and upon physiological effects desired. For purposes of practical administration to patients exhibiting a wide variety of physical conditions, the tablets listed in Table I were found to be quite satisfactory. The numerical values in Table I represent parts by weight, in grains, and the total weight is exclusive of the final coating, which may be of any conventional type.

*Table I*

| Thyroprotein | Strophanthin | Carrier | Tablet Total |
|---|---|---|---|
| 0.50 | 0.0083 | 1.4917 | 2.0 |
| 1.25 | 0.0208 | 1.4292 | 2.7 |
| 0.75 | 0.0063 | 1.6437 | 2.4 |

In the above listed tablets, the first two contain thyroprotein and strophanthin in proportions of 60 parts by weight of thyroprotein to 1 part by weight of strophanthin, while the third listed tablet contains 120 parts by weight of thyroprotein to 1 part by weight of strophanthin. These active ingredients may be combined in larger or smaller proportions than those listed, if desired. Strophanthin was provided in the form of the glycoside derived from Strophanthus kombe. The carrier consisted of a mixture of dextrose, dextrin and acacia as binder, and a tablet lubricant of magnesium stearate.

In the preparation of the foregoing tablets, the initial quantities of thyroprotein and binder were thoroughly mixed together. The strophanthin was prewetted initially with anhydrous alcohol, such as isopropyl alcohol, and then dissolved in water. The solution then was added to the thyroprotein-binder mixture to form a wet granulation. The wet granulation then was either dried, or granulated while wet and then dried. In either case the granulated dry mixture was again granulated, preferably through a No. 10 heavy mesh screen and finally through a No. 20 heavy mesh screen. To this mixture was added a quantity of tablet lubricant, and after thorough mixing the tablets were formed in a tablet machine and coated.

The tablets listed in Table I were employed in the treatment of obesity of human patients exhibiting various types of physical conditions. For example, certain patients reacted favorably with daily oral administration of from one to four of any one of the tablets listed, while other patients required daily oral administration of thirty or more tablets. In every case, however, each of the patients thus treated responded favorably, without incurring deleterious side effects. The treatment period for the several patients ranged from about 5 months to 17 months, and the loss in weight of each patient was substantially constant at about one pound per week. Moreover, all patients maintained normal eating habits, without restriction.

From the foregoing it will be apparent that the present invention provides a composition which is characterized by consistent effectiveness in the treatment of obesity. It is capable of safe and effective use in large dosages, and it does not produce the deleterious side effects inherent in the use of prior compositions.

It will be apparent to those skilled in the art that variations in the method of manufacture and in the size, concentration and proportions of ingredients of the composition described herein may be made without departing from the spirit of this invention. Additionally, although the composition has been described herein as being of particular utility in the reduction of body weight, it will be apparent that the composition also may be used for other therapeutic purposes. Accordingly it is to be understood that the foregoing description is primarily illustrative of the invention and is not to be considered as limiting the scope thereof.

Having now described my invention and the manner in which the same may be used, what I claim as new and desire to secure by Letters Patent is:

1. A therapeutic composition adapted for oral administration and comprising thyroprotein and strophanthin.
2. A therapeutic composition adapted for oral administration and comprising thyroprotein and strophanthin in proportions by weight of from about 60 to 120 parts thyroprotein to one part stronphanthin.
3. A therapeutic composition adapted for oral administration and comprising thyroprotein and strophanthin as active ingredients, in admixture with a carrier.
4. A therapeutic composition adapted for oral administration and comprising thyroprotein and strophanthin as active ingredients, in admixture with a carrier for oral administration.
5. A therapeutic composition adapted for oral administration and comprising thyroprotein and strophanthin as active ingredients, in admixture with a powdered carrier, the composition being in the form of a tablet for oral administration.
6. A therapeutic composition adapted for oral administration and comprising from about 25 to about 50 percent by weight of thyroprotein, from about 0.4 to about 0.8 percent by weight of strophanthin, and from about 49 to about 75 percent by weight of carrier.

References Cited in the file of this patent

UNITED STATES PATENTS 2,379,842     Turner                July 3, 1945

OTHER REFERENCES

Kuusisto: Chem. Abst., vol. 47, 1953, p. 2359h.
Werner: Chem. Abst., vol. 43, 1949, p. 7131H.
U.S. Disp., 24th ed., 1947, pp. 1121, 1122, 1744, 1222–1224.
Goodman: Pharmacological Basis of Therapeutics, 1941, pp. 1160, 1161, 1168 and 1169, Macmillan Co., N.Y.C.
Thomas: J. Dairy Science, vol. 36, No. 7, July 1953.
U.S. Disp. (Wood), 21st ed., 1926, p. 1033.
Gutman: Modern Drug Encycl. and Therapeutic Guide, 1934, Am. J. of Surgery Inc., N.Y.C., p. 180.